United States Patent
Goldberg et al.

(10) Patent No.: US 6,449,541 B1
(45) Date of Patent: Sep. 10, 2002

(54) APPLICATION-TO-COMPONENT COMMUNICATIONS HELPER IN A VEHICLE COMPUTER SYSTEM

(75) Inventors: Jossef Goldberg, Seattle; Timothy J. Cullen, Redmond; Owen W. Paulus, Seattle; Mark M. Moeller, Bellingham, all of WA (US); Paul A. Horenberger, Santa Barbara, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/690,979

(22) Filed: Oct. 17, 2000

(51) Int. Cl.[7] .............................. G06F 7/00; G06F 9/44; G06F 13/10
(52) U.S. Cl. ........................... 701/36; 701/33; 707/102; 707/103 R
(58) Field of Search ................................ 701/1, 36, 33; 707/102, 103 R, 103 Y, 103, 103 Z; 709/315, 201, 311; 717/100, 120

(56) References Cited

U.S. PATENT DOCUMENTS

| | | | | |
|---|---|---|---|---|
| 5,485,617 A | * | 1/1996 | Stutz et al. | 395/700 |
| 5,890,078 A | * | 3/1999 | Furuta | 701/1 |
| 5,964,843 A | * | 10/1999 | Eisler et al. | 709/300 |
| 6,052,632 A | * | 4/2000 | Iihoshi et al. | 701/36 |
| 6,236,909 B1 | * | 5/2001 | Colson et al. | 701/1 |
| 6,263,262 B1 | * | 7/2001 | Bitzer et al. | 701/1 |

* cited by examiner

Primary Examiner—Tan Nguyen
Assistant Examiner—Dalena Tran
(74) Attorney, Agent, or Firm—Lee & Hayes, PLLC

(57) ABSTRACT

An application-to-component communication helper facilities communication between applications running an in-vehicle computer to an in-vehicle component. Each vehicle part has a corresponding object, and each object exposes a pre-defined Device Communication Application Programming Interface (DCAPI). Some objects are built-in, meaning that they are defined to some degree by the operating system, and rely on the operating system for at least parts of their functionality. Other objects are add-on objects, meaning that they are provided apart from the operating system, for subsequent installation and use in conjunction with the operating system. The operating system provides a "device helper" that allows add-on components to participate and utilize access management and notification features provided by the operating system. The device helper exposes its method for use by corresponding device-com methods of component objects. The object calls the device helper method that corresponds to the called device-com method. This greatly simplifies the tasks of application programmers, and allows access management and notification services to be coordinated between the various component objects.

49 Claims, 5 Drawing Sheets

Fig. 1 (background)

(background)

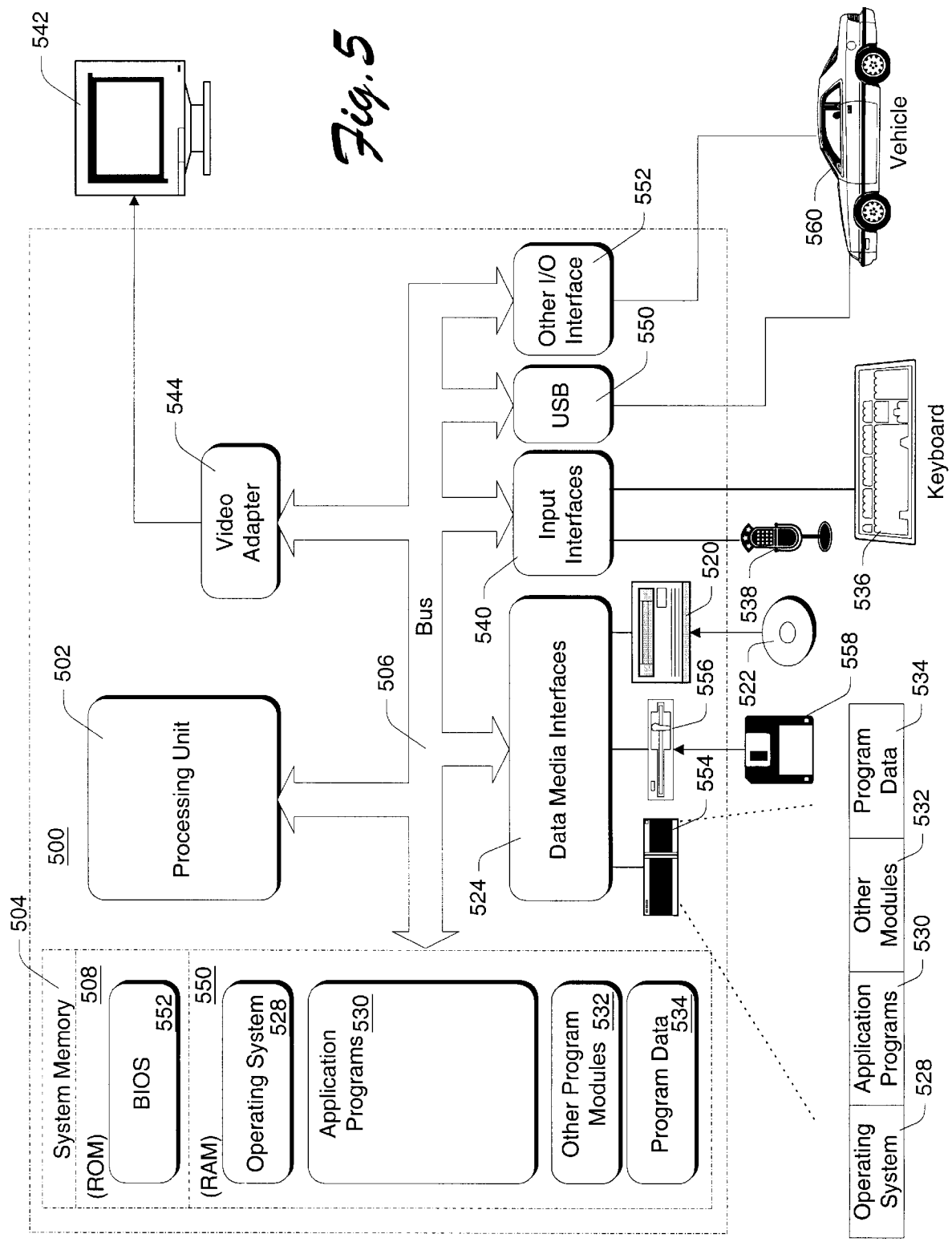

APPLICATION-TO-COMPONENT COMMUNICATIONS HELPER IN A VEHICLE COMPUTER SYSTEM

TECHNICAL FIELD

This invention relates to computer systems for automobile vehicles. More particularly, this invention relates to software for such computer systems. More particularly still, this invention relates to software programming interfaces for such computer systems.

BACKGROUND

Modern automobile vehicles are typically equipped with several independent electronic systems. For example, many vehicles have the following systems: sound systems, security systems, vehicle diagnostic systems, global positioning system (GPS) navigational systems, and wireless communications systems.

Most late model automobiles are constructed with a diagnostic system that analyzes performance of the vehicle's engine, transmission and fuel system, and other vehicle peripheral devices. In particular, 1993–1995 model vehicles use a standard called OBD I, and 1996 model vehicles or later have OBD II. (OBD is On-Board Diagnostics).

The various vehicle electronics systems have proven useful to their users. However, these systems are typically unrelated and incompatible. This problem was solved by in-vehicle computers. A popular example of such an in-vehicle computer ("vehicle computer") is a product known as "Auto PC" and its associated operating system. A vehicle computer, like the "Auto PC," is described in detail in U.S. Pat. No. 5,794,164 to Beckert et al., which is incorporated herein by reference.

FIG. 1 shows a vehicle computer system 20. Vehicle computer system 20 has a centralized vehicle computer 22, like the Auto PC, operatively coupled to peripheral electronic systems and devices in an automobile. Essentially, the vehicle computer 22 is small computer that controls and monitors these peripheral components. It also provides functions that are traditionally associated with personal computers, such as an address database.

FIG. 1 shows peripheral components in the vehicle computer system 20. The components shown in FIG. 1 include a monitor 23, security sensors 25, a CD player 27, antenna(s) 29, speakers 31, a GPS receiver 33, an engine diagnostic component 35, other "built-in" vehicle component(s) 37, and "add-on" vehicle 11 component(s) 39. A "built-in" component is one with its definition built into the operating system of the vehicle computer. An "add-on" component is one that does not have its definition built into the operating system.

In general, a vehicle component is a part, device, or system that is capable of generating any vehicle-related data. In addition, a vehicle component is any part, device, or system that is capable of controlling any vehicle-related function. A vehicle component may also be called a peripheral or device.

Some additional examples of components include: switches, sensors, GPS receivers, MP3 players, DVD players, microphones, security systems, sound systems, navigational systems, wireless communications systems, vehicle diagnostic systems, microphone, multimedia systems, storage systems, climate control systems, batteries, and ignition systems.

FIG. 1 shows the computer 22 coupled directly to each component. Alternatively, one or more vehicle buses may connect multiple components to the computer 22 via vehicle gateways. A gateway is a hardware device that physically connects a component to an in-vehicle communications pathway (like an internal vehicle bus). For example, a vehicle may include a vehicle bus that provides the pathway for in-vehicle communications. A gateway provides a physical bridge attaching the component to that bus. Such a bus may be a USB. Such a component may be the vehicle diagnostics system and its Onboard Diagnostic Bus (ODB II). A gateway may be an ODB-USB hardware bridge.

The vehicle computer 22, like most computers, has an operating system and applications that execute there under. The applications can control or monitor the sound systems, security systems, vehicle diagnostic systems, global positioning system (GPS) navigational systems, wireless communications systems, and other systems. They may also provide an address database and provide a user interface.

The Auto PC uses a specially designed version of the "Windows CE" operating system by the Microsoft Corporation. The "Windows CE" operating system has a number of Application Program Interfaces (APIs) that are helpful to application program developers. These APIs are called by applications to perform a host of basic functions, so that the applications themselves need not implement such basic functions. Those who are skilled in the art are generally familiar with APIs and their use.

The following table shows examples of the APIs that the "Windows CE" version for the Auto PC supports:

TABLE 1

| API | Description |
| --- | --- |
| Address Book | Enables access to the contact database. |
| Audio manager | Controls the audio system. |
| Forms Manager | Manages forms that comprise an Auto PC application. |
| Positioning & Navigation | Device interface for positioning, navigation, and GPS. |
| Power Management | Supports power management. |
| Speech API (SAPI) | Controls speech and text to speech. |
| Tuner | Supports the AM/FM tuner. |
| Vehicle I/O | Enables access to vehicle maintenance and diagnostic data, and allows an application to control vehicle operations. |
| WAV-in | Handles audio sources. |
| WAV-out | Handles audio destinations. |
| Win32 | Interface to the operating system. |

As shown in the above table, one of API sets is for the vehicle input/output ("Vehicle I/O") system. The Vehicle I/O APIs ("VIOAPIs") enable access to vehicle maintenance and diagnostic data and allows an application to control vehicle operations. VIOAPIs are a specific implementation of a generic set of APIs called Device Communication Application Programming Interfaces (DCAPIs). Generally, DCAPIs are used by applications to communicate with peripheral vehicle components to monitor, collect, diagnose vehicle data and to control vehicle functions.

FIG. 2 shows the conventional communication techniques for an application on the vehicle computer 22 to communicate with components 74 and 76. An application 50 running on the vehicle computer may communicate with any component registered with operating system 52 of the computer. Operating system 52 includes APIs and their associated methods. More particularly, operating system 52 includes DCAPIs to facilitate communication between the application 50 and components.

The DCAPIs include interface methods to facilitate component communication and provide standard interfaces for the applications. The DCAPIs also provide access management and notification features. Herein, these methods are generically called "device-communication" methods or "device-com" methods. The definitions of "device-com" interfaces and methods are drawn from the DCAPIs. Specific instances of device-com interfaces are shown at 54 and 56.

These interfaces and interface methods are defined and are implemented (at least in part) for each different type of peripheral component supported by the operating system. Specifically, in a system having a plurality of peripheral components and corresponding objects, each object has its own device-com methods that can be called by application programs. Although each of these device-com methods might communicate with a different type of component, the calling parameters of each device-com method are identical-the DCAPI of each object supports the same set of methods.

The following is a table of frequently used "device-com" methods of the Auto PC's implementation of DCAPI:

TABLE 2

| Device-com Methods | Description |
| --- | --- |
| IVIO_Device::GetData | Retrieves the current data from the requested component |
| IVIO_Device:: get_AccessMode | Returns the current access for a requested mode |
| IVIO_Device::SetData | Sends control information to the requested component |
| IVIO_Device::set_AccessMode | Sets the access mode for the component |
| IVIO_Device::SetNotify | Allows the addition of a notification sink to a given component to allow notification of the application by a component on a timed basis |
| IVIO_Device::get_Status | Returns the current availability of the component |

Application 50 uses the "device-com" methods of the DCAPIs (represented by interfaces 54 and 56) to communicate though component objects 58 and 60. Although the specific implementation of the device-com methods of 54 and 56 are different (because the component objects are different), the device-com methods are drawn from the same definitions in the DCAPIs.

As shown in FIG. 2, communication between the objects 58 and 60 goes through intermediate software and hardware elements: mini-drivers 62, 66; device drivers 66, 68; and vehicle gateways 70, 72. These elements are standard Windows I/O elements, specifically tailored for a particular component. Components 74 and 76 are physically installed in a vehicle 80.

Mini-drivers 62, 64 are small component-specific objects that perform component-specific, low-level communication and data conversion. Mini-drivers are positioned between component objects and device drivers in the data flow path.

Device drivers 66, 68 are software that performs low-level communication functions so that transmissions can be sent/received over a specific physical medium and its communications protocol. Examples of such physical media and protocols are USB (Universal Serial Bus), RS-232, and proprietary in-vehicle buses. Device drivers are positioned between mini-drivers and vehicle gateways in the data flow path.

Vehicle gateways 70, 72 are hardware devices that physically connect components to the in-vehicle communications pathway, such as USB, RS-232, and proprietary in-vehicle buses. Gateways are positioned between device drivers and the components in the data flow path.

The application 50 could conceivably communicate with components 74, 76 directly through mini-drivers and device drivers and bypass the DCAPI and objects. However, this would require quite a detailed knowledge of the capabilities and protocols supported by each component. To reduce the burden placed on application programmers, components are represented by programming objects (such as 58 and 60). The objects have interfaces (DCAPIs) and interface methods (device-com) that can be called by the application to communicate with the components. The interfaces and methods hide the details of component communications from the application.

The Auto PC version of Windows CE integrally defines a number of different vehicle component objects, corresponding to different types of vehicle components. Such objects are referred to herein as "built-in" objects because they are provided with the Auto-PC and/or its operating system. Each of the objects exposes the pre-defined DCAPI.

The architecture described thus far provides an easy way to support new components that do not have built-in object definitions in the Auto-PC. When designing a new component, the manufacturer also designs a new object. The object is designed to support the DCAPI. When the component is installed in a system, the new object (or its definition) is also installed on the vehicle computer. An application program can then invoke the methods of the DCAPI to access the functionality of the underlying component. Again, the application program does not have to be concerned with low-level communication details.

Component objects such as this, which are not designed as part of the operating system, are referred to herein as "add-on" objects. The ability to use add-on objects is extremely beneficial. However, there remains one disadvantage to using add-on objects, relating to certain management functions provided for use in conjunction with the built-in objects. Specifically, the built-in components provide access control and notification capabilities. The add-on components are not able to provide access control and notification capabilities.

With reference to FIG. 2, the following describes the conventional communications between an application and a built-in component. The application 50 initiates communications with the built-in component 74 using the operating system 52. The application employs the standard "device-com" method 54 to communicate to the built-in component 74 through its object 58. An example of a "device-com" method typically used is an access management method called IVIO_Device::GetData (or simply "get-data").

Like its name implies, the get-data method is designed to request data from a component. The get-data method is called with two parameters. One is the address of a memory location that will hold the data in the response from the component. The other parameter is the amount of time to wait from a reply from the component. In addition to returning data, the component may indicate an error condition like: the component does not implement the requested data read, bad address, access denied, and unexpected error.

Built-in component object 58 does not include any low-level communication functionality to communicate with mini-driver 62. Rather, it relies on the functionality of the methods and interfaces of the DCAPIs. Via the DCAPIs, the object 58 communicates with mini-driver 62. The communication proceeds through mini-driver 62, device driver 66, and gateway 70. The built-in component 74 receives the communication. The component 74 will send a response along the same path back to the object 58. The object 58 and the device-com methods 54 will send the response back to the application 50.

If no error indicator was returned, the component will return the requested data. Presumably, the application will use this data for monitoring some condition of the component and/or the vehicle. For example, the component might measure the blackness and dirtiness of the vehicle's oil. The application may use the measured values from this component to indicate whether the oil should be changed.

With reference to FIG. 2, the following describes the conventional communications between an application and an add-on component. The application 50 initiates communications with the add-on component 76 using the operating system 52. The application employs the standard "device-com" method 56 to communicate to the add-on component 76 through its object 60. The methods of interface 54 for the built-in object and the device-com methods of interface 56 for the add-on object are drawn from the same device-com definitions of the DCAPIs. Whether the component is built-in or add-on, the application sends and receives data using the same parameters and expecting the same results. An example of a "device-com" method typically used is an notification management method called IVIO_Device::SetNotify (or simply "set-notify").

The set-notify method is used by an application to instruct a component to send regular notification signals back to the application. The set-notify method is called with three parameters. One is the address of a memory location that will hold additional information about starting the notification. The second parameter is the address of the event sink. The third parameter indicates the frequency that the component should notify the application. The component may indicate an error condition like: the component does not implement the requested notification, bad address, access denied, and unexpected error.

Unlike the built-in object 58, the add-on object 60 includes its own low-level communication functions for communicating with the mini-driver. It does not employ the functionality of the DCAPIs. The add-on object 60 cannot use the object-minidriver-communication functionality of the standard DCAPIs because the add-on object is not integrally defined within the DCAPIs. This means that software developers must program all of the communication functionality into the add-on object 60.

On its own, the add-on object 60 communicates with mini-driver 64. The communication proceeds through mini-driver 64, device driver 68, and gateway 72. The add-on component 76 receives the communication. The component 76 will send a response along the same path back to the object 60. The object 60 and the device-com methods 56 will send the response back to the application 50.

If no error indicator was returned, the component will send notification signals to the event sink. The event sink is implemented by the DCAPIs and the application looks there to receive its notifications from the component.

It is possible for add-in components to implement the same access control and notification capabilities as the built-in components. However, this requires significant programming effort, which must then be repeated by each application programmer. Furthermore, without expensive and cumbersome specialized modifications, applications are unable to access and fully utilize the new add-on component.

The architecture described below addresses this deficiency in the conventional application-to-component communication techniques.

SUMMARY

Described herein is a system for communicating with vehicle components such as described above. Each vehicle component has a corresponding object, and each object exposes a pre-defined Device Communication Application Programming Interface (DCAPI). Some objects are built-in, meaning that they are defined to some degree by the operating system, and rely on the operating system for at least parts of their functionality. Other objects are add-on objects, meaning that they are provided apart from the operating system, for subsequent installation and use in conjunction with the operating system.

The operating system provides a "device helper" that allows add-on components to participate and utilize access management and notification features provided by the operating system. The device helper exposes its method for use by corresponding device-com methods of component objects. The object calls the device helper method that corresponds to the called device-com method. This greatly simplifies the tasks of application programmers, and allows access management and notification services to be coordinated between the various component objects.

BRIEF DESCRIPTION OF THE DRAWINGS

A more complete understanding of the various methods and arrangements of the present invention may be had by reference to the following detailed description when taken in conjunction with the accompanying drawings wherein:

FIG. 5 is a schematic drawing showing an exemplary computer that may be used in an implementation of the exemplary application-to-component communication helper..

DETAILED DESCRIPTION

The following description sets forth a specific embodiment of an application-to-component communication helper that incorporates elements recited in the appended claims. This embodiment is described with specificity in order to meet statutory written description, enablement and best-mode requirements. However, the description itself is not intended to limit the scope of this patent. Rather, the inventors have contemplated that the claimed application-to-component communication helper might also be embodied in other ways, in conjunction with other present or future technologies.

Figure 1:
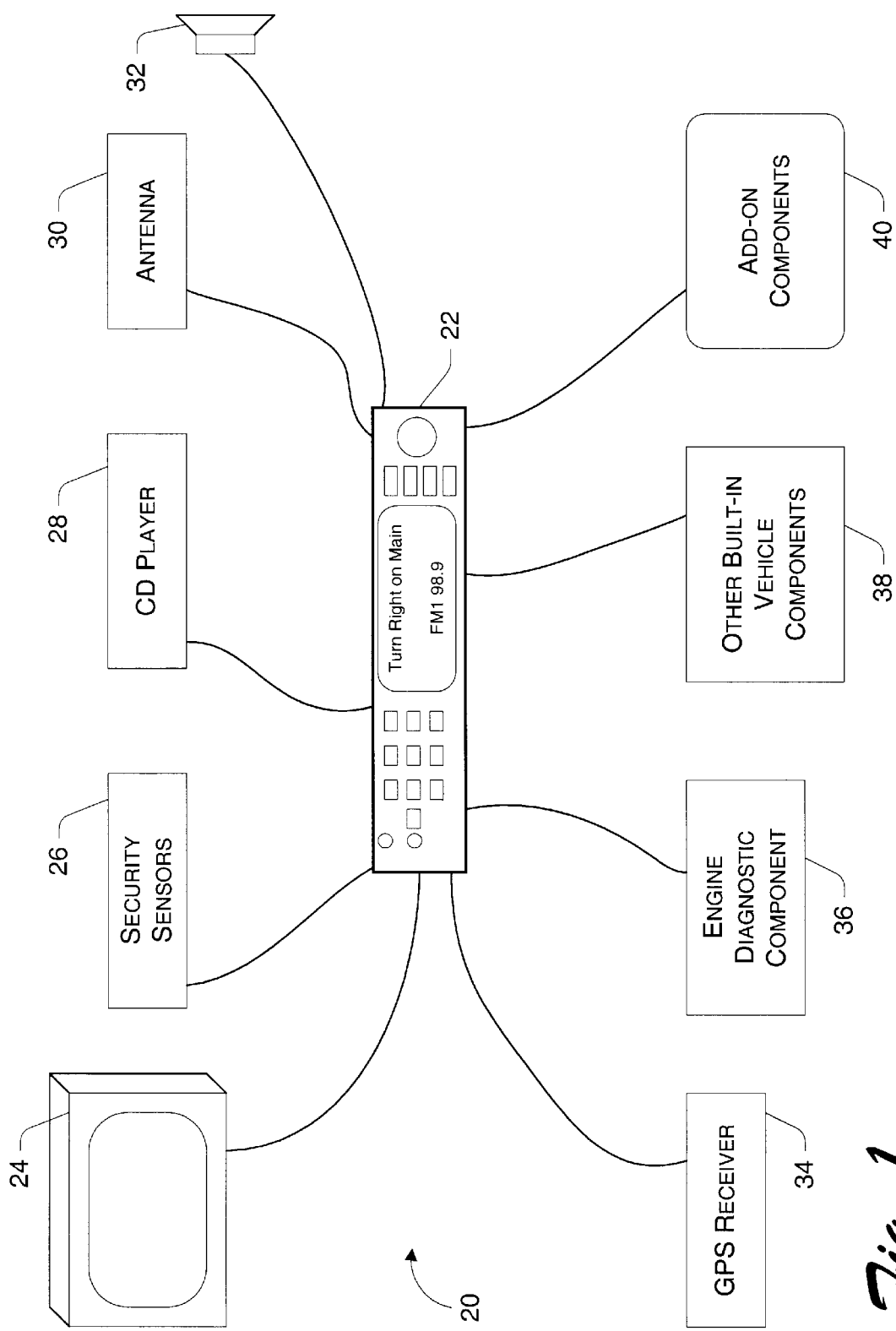
FIG. 1 is schematic block diagram of a vehicle computer system capable of implementing an exemplary application-to-component communication helper.
Figure 2:
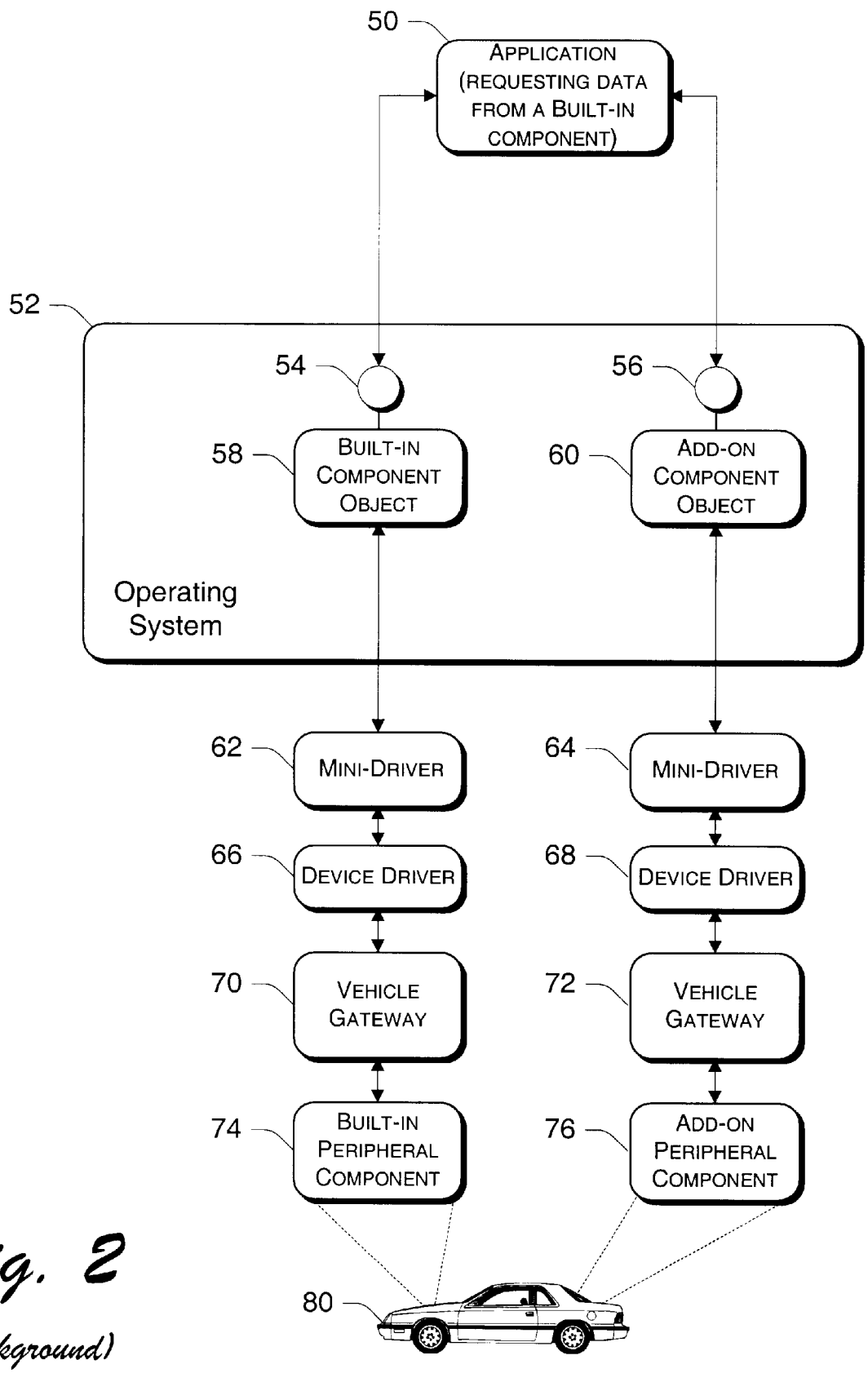
FIG. 2 is data flow diagram of a prior art techniques to communicate with a "built-in" and "add-on" components in a vehicle.
Figure 3:
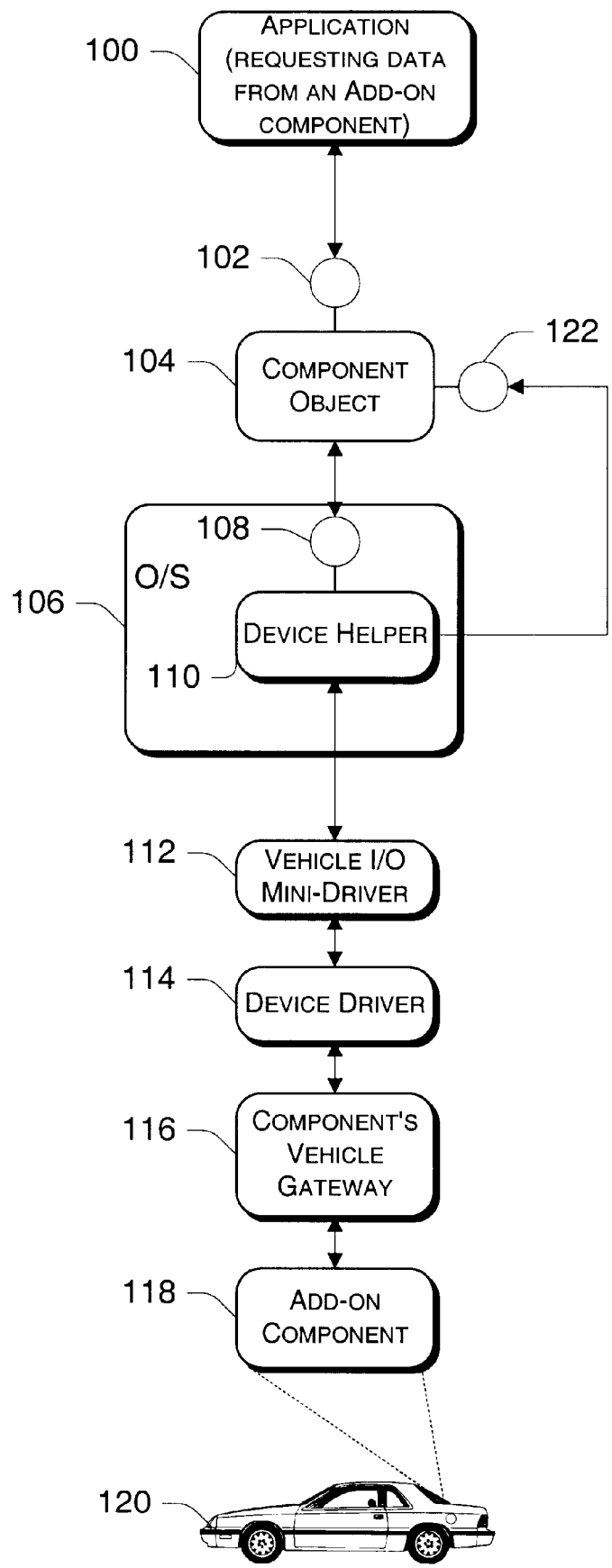
FIG. 3 is data flow diagram illustrating the technique to communicate with an "add-on" component, where the technique employs the exemplary application-to-component communication helper.

FIG. 3 shows the various elements involved in communications with a peripheral component 118. A vehicle may contain many peripheral components that are connected to the vehicle computer. In the example, this peripheral component is an "add-on" component. The component 118 is represented by an object 104.

FIG. 3 shows application 100 communicating with a "device-com" interface 102 of a component object 104 to accomplish communications with component 118.

As shown in FIG. 3, communication between object 104 and component 118 goes through intermediate software and hardware elements: mini-driver 112, device driver 114, and vehicle gateway 116. These elements are standard Windows I/O elements, specifically tailored for a particular component. Component 118 is physically installed in a vehicle 120.

A mini-driver is small component-specific object that performs component-specific, low-level communication and data conversion. A device driver is software that performs low-level communication functions so that transmissions can be sent/received over a specific physical medium and its communications protocol. A vehicle gateway is a hardware device that physically connects components to the in-vehicle communications pathway.

Each component is represented by an object such as 104. In the case of "built-in" components, these objects are defined by object class definitions that are designed and programmed in conjunction with the operating system. "Add-on" objects are installed later, for use in conjunction with features provided by the operating system.

To encourage the development of software for the vehicle computer, the operating system defines a standard Device Communications Application Programming Interface (DCAPI). This DCAPI, exposed by component objects corresponding to the different types of peripheral components, provides a standard and easy way for applications to get input from a component and to produce output to a component. Using the standard DCAPI, applications need not know the low-level details of how such input and output is accomplished.

FIG. 3 shows a particular instance 102 of DCAPI methods and interfaces in conjunction with object 104, which represents component 118 in vehicle 120. The DCAPI enables access to vehicle maintenance and diagnostic-data from vehicle components. The DCAPI also allows an application to control vehicle operations via the vehicle components. The DCAPI includes standard methods for communications with components that are called "device-com" methods.

There are two types of "device-com" methods: access management and notification management. Access management methods are used by applications' to send data to a component and read data from a component. These methods also control access to a component to read or send data. Notification management methods are used by applications to instruct the components to send regular notification signals.

Examples of such device-com methods are given above in Table 2. A typical "device-com" method used is an access management method called IVIO_Device::GetData (or simply "get-data"). As its name implies, the get-data method is designed to request data from a component. The get-data method is called with two parameters. One is the address of a memory location that will hold the data in the response from the component. This address may also contain additional information to send to the component for the get-data request. The other parameter is the amount of time to wait from a reply from the component. In ii addition to returning data, the component may indicate an error condition like: the component does not implement the requested data read, bad address, access denied, and unexpected error.

Another typical "device-com" method used is an access management method called IVIO_Device::SetData (or simply "set-data"). As its name implies, the set-data method is designed to send data to a component. It is typically used to direct a component to control one of its functions or a vehicle function. An application calls the set-data method with two parameters. One is the address of a memory location that will hold the data to be passed to the component. The other parameter is the amount of time to wait from a reply from the component. In addition to receiving data, the component may indicate an error condition such as: the component does not implement the requested data write, bad address, access denied, and unexpected error.

Still another typical "device-com" method used is an notification management method called IVIO_Device::SetNotify (or simply "set-notify"). The set-notify method is used by an application to instruct a component to send regular notification signals back to the application. The set-notify method is called with three parameters. One is the address of a memory location that will hold additional information about starting the notification. The second parameter is the address of the event sink. The third parameter indicates the frequency that the component should notify the application. The component may indicate an error condition like: the component does not implement the requested notification, bad address, access denied, and unexpected error.

The operating system of the embodiment described herein provides a device helper, which is represented as device-helper object 110 in FIG. 3. The device helper provides services to component object 104, allowing component object 104 to utilize the access management and notification functionality of the operating system. Specifically, the device helper exposes a device-helper interface 108, having methods that are called by component objects to perform various functions such as sending data to a peripheral component. These methods of the device helper interface are called "device-helper."

There are many different types of device-helper methods and generally, each corresponds to a device-com method. For example, a set-data request sends data to the component 118 so that vehicle functions controlled by the component 118 can be controlled. The set-data device-helper method corresponds to a set-data device-com method.

A get-data device-helper method seeks data about the component 118. The get-data device-helper method corresponds to the get-data device-com method.

A get-availability device-helper method may inquire whether the vehicle computer is configured to access the component 118.

A get-mode-access device-helper method inquires about the current access type of the component 118 given a specific read-write mode. A mode is either read or write. For each given mode, a computer allows a particular application the following types of access to the component 118: no access, exclusive access, or shared access. In addition, the request may set the current access type of the component 118 given a specific read-write mode. The get-mode-access device-helper method corresponds to the get-access-mode device-com method.

A get-mini-driver device-helper method specifies that communications to the component 118 should go through its associated mini-driver.

A put-notify-sink device-helper method instructs the component 118 to send periodic notifications to the vehicle computer. The put-notify-sink device-helper method corresponds to the set-notify device-com method.

Description of FIG. 3 using Access Management

If the application 100 wishes to get data from component 118, it will mostly likely use the get-data interface 102 to access the component's object 104. The get-data method is a device-com method used for access management of the component. Whether the component 118 is an "add-on" or a "built-in" component, an identically defined get-data method is used by the application to access the component's object 104.

The component object 104 does not include low-level communication functionality; therefore, it will call upon such functionality of the operating system 106. Specifically, it uses the device-helper interfaces and methods at 208 and 210. More specifically, the get-data device-com method will cause the corresponding get-data device-helper method to be called.

The communications flows across the mini-driver 112, device driver 114, and gateway 116 to arrive at the component 118 in the vehicle 120. The component sends a response back along the same pathway until it gets to the device helper at 210. There the data is sent through a conversion interface 122 back to the object. The conversion interface converts the data from its raw format into a format that is usable by the application.

Description of FIG. 3 using Notification Management

If the application 100 wishes to have the component 118 automatically send it notifications, it will mostly likely use the set-notify interface and method at 102 to access the component's object 104. The set-notify method is a device-com method used for notification management. Whether the component 118 is an "add-on" or a "built-in" component, the same set-notify method is used by the application to instruct the component to send notifications.

The component object 104 does not include low-level communication functionality; therefore, it will call upon such functionality of the operating system 106. Specifically, it uses the device-helper interfaces and methods at 208 and 210. More specifically, the set-notify device-com method will cause the corresponding put-notify-sink device-helper method to be called.

The communications flows across the mini-driver 112, device driver 114, and gateway 116 to arrive at the component 118 in the vehicle 120. The component sends a response back along the same pathway until it gets to the device helper at 210. There the data is sent through a conversion interface 122 back to the object. The conversion interface converts the data from its raw format into a format that is usable by the application.

The component will now send asynchronous notifications to an event sink of the operating system. The application will check the event sink for such notifications.

Detailed Description of IVIO_DeviceHelper Methods

The device-helper interfaces and methods are implemented in the vehicle I/O APIs (VIOAPIs) of the Windows CE version for the Auto PC. The VIOAPI implementation of the device helper is called "IVIO_DeviceHelper." Examples of the available IVIO_DeviceHelper methods are get_Availability; get_ModeAccess; put_ModeAccess; get_Mini-driver; GetData; SetData; and put_NotifySink.

The following are detailed descriptions of the available IVIO_DeviceHelper methods of the VIOAPIs implementation of DCAPI:

get_Availability
Description
This verifies that all of the necessary software and hardware of the desired component are properly installed. The component's object is registered with the APIs along with the drivers and mini-drivers.

Syntax
  HRESULT IVIO_DeviceHelper::get_Availability (
    BOOL *pfAvailable
  );
Parameters
  [out] pAvailable—Address of a BOOL that will return one of the following status values:
    TRUE—The component is available
    FALSE—The component is not available
Return Values
  S_OK—Successfully retrieved the availability of the device.
  E_POINTER—the pAvailable pointer is invalid
  E_UNEXPECTED—An unexpected error occurred while retrieving the status.
get_ModeAccess
Description
  Get the current, available access for a particular mode. For example, verif that exclusive access for component writes are possible. Returns the access type for a requested mode for an instance of a component object.
Syntax
  HRESULT IVIO_DeviceHelper::get_ModeAccess (
    VIODEVICEMODE dwMode;
    VIODEVICE ACCESS *pAccessMode
  );
Parameters
  [in] dwMode—Type of mode that is requesting access. This parameter can have the following values:
    VIODEVICEMODE_READ—This requests the component's read-mode access type.
    VIODEVICEMODE_WRITE—This requests the component's write-mode access type.
  [out] pAccessMode—Address to store the requested access for the requested mode. This parameter may have the following values:
    VIODEVACCESS_SHARED—The component is currently shared.
    VIODEVACCESS_EXCLUSIVE—The component currently has exclusive access.
    VIODEVACCESS_NONE—There is no access for the requested mode.
Return Values
  S_OK—The access mode was successfully read.
  E_INVALID—The dwMode parameter was invalid.
  E_POINTER—The pAccessMode pointer is invalid.
  E_UNEXPECTED—An unexpected error occurred while requesting access.
put_ModeAccess
Description
  Sets the access type (shared or exclusive) for a particular mode (read or write) of a component. Manages access between instances of a component's class throughout the system.
Syntax
  HRESTULT IVIO_DeviceHelper::put_ModeAccess (
    VIODEVICEMODE dwMode
    VIODEVICEACCESS dw,ccessMode
  );
Parameters
  [in] dwMode—Mode for which the access type is to be set. This parameter can have the following values:
    VIODEVICEMODE_READ—This sets the component's read-mode access.

VIODEVICEMODE_WRITE—This sets the component's write-mode access.

[in] dwAccessMode—Type of access requested for the component's modes. This parameter may have the following values:

VIODEVACCESS_SHARED—This sets the component as a sharable.

VIODEVACCESS_EXCLUSIVE—This sets the component as an exclusive component, which cannot be shared.

Return Values

S_OK—The access mode was successfully set.

E_INVALID—One of the parameter is invalid.

E_ACCESSDENIED—The application was unable to change the access type because another process or thread has already set the access.

getMini_driver

Description

Get the mini-driver interface the component's object uses for low-level access to the component. Requests the component's mini-driver be used to access the component.

Syntax

HRESTULT IVIO_DeviceHelper::get_GetData (
    IVIO_Minidriver **ppMinidriver
);

Parameters

[out] ppMini-driver—Address to store the mini-driver interface pointer that the VIOAPI uses to make requests to the component.

Return Values

S_OK—Successfully retrieved the mini-driver interface from the component.

E_POINTER the pData pointer is invalid.

GetData

Description

Requests data from the vehicle to the component object's mini-driver. This also validates access rights for the component's object instance.

Syntax

HRESTULT IVIO_DeviceHelper::GetData (
    IVIO_ConvertMiniDrvData *pconvert,
    LPVARIANTpData,
    DWORD dwTimeOut
);

Parameters

[in] pConvert—Address of the interface used to convert between the raw data coming from the minidriver to a VARIANT type that is returned to the calling function.

[in/out] pData—Address of a VARIANT type that contains the data from the component. The data at this address can also be additional data to send to the component for the request.

[in] dwTimeOut—Amount of time in milliseconds to wait for a reply to the request for data.

Return Values

S_OK—Successfully retrieved data from the device.

E_NOTIMPL—This component does not implement data reads.

E_POINTER—The pData pointer is invalid.

E_ACCESSDENIED—Access to this component is denied.

E_UNEXPECTED—An unexpected error occurred reading data from the device.

SetData

Description

Sends control information to the vehicle. This also performs validation of access rights of the object instance.

Syntax

HRESTULT IVIO_DeviceHelper::SetData (
    IVIO_ConvertMiniDrvData *pconvert,
    const LPVARIANT pData,
    DWORD dwTimeOut
);

Parameters

[in] pConvert—Address of the interface used to convert between the VARIANT type to raw data that is sent to minidriver.

[in] pData—Pointer to a VARIANT containing the control information to be passed to the component.

[out] dwTimeOut—Amount of time in milliseconds to wait for a reply to the control request.

Return Values

S_OK—Successfully sent data to the device.

E_NOTIMPL—This component does not implement control functionality.

E_POINTER—The pData pointer is invalid.

E_ACCESSDENIED—Access to this component is denied.

E_UNEXPECTED—An unexpected error occurred while sending data to the component.

put_Notif Sink

Description

Sets up a VIO event sink with the notification manager of the API so that the component can send asynchronous notifications to applications.

Syntax

HRESTULT IVIO_DeviceHelper::put_NotifySink (
    const LPVARIANT pParameterData
    IVIO_ConvertMiniDrvData *pconvert,
    IVIO_EventSink *pEventSink,
    DWORD dwFreq
);

Parameters

[in] pParameterData—Address of a VARIANT structure that contains additional information for starting the notification.

[in] pConvert—Address of the interface that the API uses to convert the raw data returned from the component to VARIANT data returned to the application.

[in] pEventSink—Address of an event sink interface. This interface's method is called by the API at notification time.

[out] dwFreq—Frequency in milliseconds at which the application should be notified by the component.

Return Values

S_OK—Notification sink successfully set in the API.

E_POINTER—The pEventSink pointer is invalid.

E_ACCESSDENIED—A notification sink is already in place for the component, or the device has exclusive read access.

E_UNEXPECTED—An unexpected error occurred while trying to add the notification sink to the component.

Figure 4:
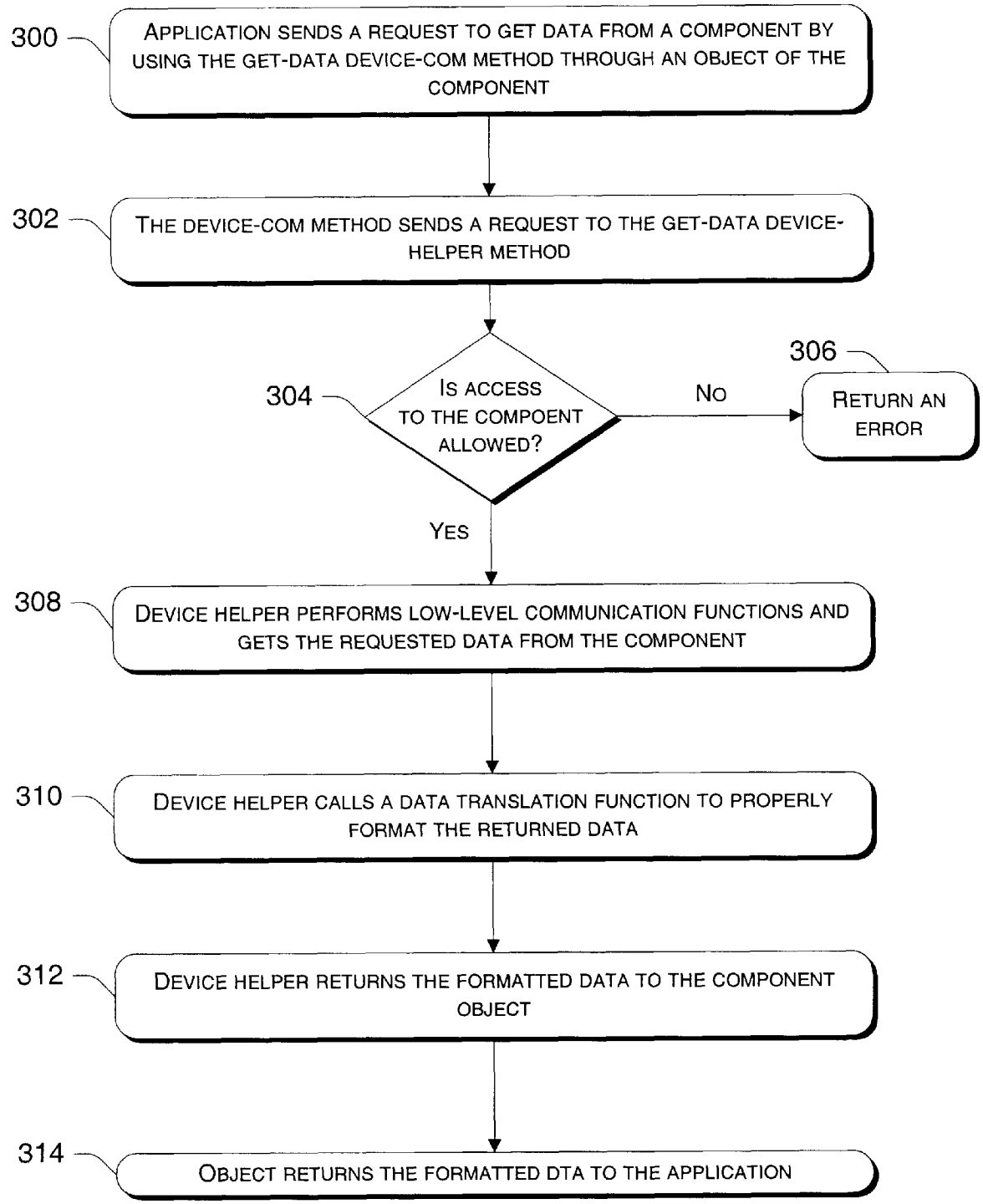
FIG. 4 is a flowchart showing a process implementing an exemplary application-to-component communication helper.

FIG. 4 shows an example of a process of requesting and receiving data from a peripheral component. This is an example of a process that implements the application-to-component communication helper.

At 300, an application sends a request to get data from a component by using the get-data device-com method through an object of the component. At 302, the device-com method sends a request to the get-data device-helper method.

At 304, the component's object determines whether access to the component via the device-helper method is allowed. If not, then returns an error indicating so at 306. Otherwise, the process continues onto block 308.

At 308, the device helper takes care of low-level communication details and gets the requested data from the device. At 310, the device helper calls a data conversion (i.e., translation) function to properly format the returned data.

At 312, the device helper returns the formatted data to the component object. At 314, the component object returns the formatted data to the application, as part of the response to the get-data device-com method.

Exemplary Computer

FIG. 5 shows the details of a computer that may be used with the exemplary implementation of the application-to-component communication helper. This computer may be the "Auto PC" or some other vehicle computer.

As shown in FIG. 5, computer 500 includes one or more processors or processing units 502, a system memory 504, and a bus 506 that couples various system components including the system memory 504 to processors 502. Bus 506 represents one or more of any of several types of bus structures, including a memory bus or memory controller, a peripheral bus, an accelerated graphics port, and a processor or local bus using any of a variety of bus architectures.

The system memory includes read only memory (ROM) 508 and random access memory (RAM) 510. A basic input/output system (BIOS) 512, containing the basic routines that help to transfer information between elements within computer 500, such as during start-up, is stored in ROM 508.

Computer 500 further includes a permanent secondary storage unit 514 for storing data and retrieving it. A secondary storage unit may be a magnetic disk drive or a static memory. The computer also includes a removable magnetic media reader/writer 516 for reading from and writing to a removable magnetic media 518. Such magnetic media may be a floppy disk or a flash memory card. The computer includes an optical disk drive 520 for reading from or writing to a removable optical disk 522 such as a CD-ROM, DVD-ROM or other optical media. The secondary storage unit 514, magnetic media reader/writer 516 and optical disk drive 520 are each connected to bus 506 by one or more interfaces 524.

The drives and their associated computer-readable media provide nonvolatile storage of computer readable instructions, data structures, program modules and other data for computer 500. It should be appreciated by those skilled in the art that other types of computer readable media which can store data that is accessible by a computer, such as magnetic cassettes, hard drives, digital video disks, random access memories (RAMs), read only memories (ROM), and the like, may also be used in the exemplary operating environment.

A number of program modules may be stored on the storage unit 514, magnetic disk 518, optical disk 522, ROM 508, or RAM 510, including an operating system 528 (such as "Windows CE"), one or more application programs 530, other program modules 532, and program data 534. A user may enter commands and information into computer 500 through input devices such as keyboard 536 and microphone 538. Other input devices (not shown) may include a mouse, joystick, game pad, satellite dish, scanner, or the like. These and other input devices are connected to the processing unit 502 through an interface 540 that is coupled to bus 506.

A monitor 542 or other type of display device is also connected to bus 506 via an interface, such as a video adapter 544. In addition to the monitor, the computer may include other peripheral output devices (not shown) such as speakers and printers.

The computer 500 receives input from vehicle components and sent output to such components via USB interface 550 or other I/O interfaces 552. These interfaces are coupled to components in vehicle 560.

The other interfaces 552 include RS-232, SCSI, or a proprietary interface. It may only include an interface and communications medium that is generically called the vehicle bus (e.g., car bus). Like the computer's bus, the vehicle bus couples the various vehicle components and the vehicle computer.

Computer-Executable Instructions

An implementation of the exemplary implementation of the application-to-component communication helper may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary implementation of the application-to-component communication helper may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, firmware, application specific integrated circuit (ASIC), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

This application-to-component communications helper will encourage independent hardware vendors (IHVs) and original equipment manufacturers (OEMs) to produce new vehicle components. The IHVs and OEMs need not spend time and money programming low-level communication details into their component's object. Instead, they may utilize the device helper.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In an automobile vehicle computer system having a vehicle computer operatively coupled with vehicle components, the components having representative objects, the vehicle computer having an application program interface (API) set comprising a component communications method ("device-com" method) and component communications helper method ("device-helper" method), a component communications helper method comprising:
    receiving a request to communicate with a component through its corresponding object by invoking the device-com method;
    facilitating such request by invoking a device-helper method to communicate with the component.

2. A method as recited in claim 1, wherein the receiving comprises receiving a get-availability request to get an availability status of the component.

3. A method as recited in claim 1, wherein
    the receiving comprises receiving a get-availability request to get an availability status of the component;
    the get-availability request comprises a memory address for holding a true-or-false value that indicates whether the component is available.

4. A method as recited in claim 1, wherein the receiving comprises receiving a get-availability request to get an availability status of the component, further comprising
    responding to the get-availability request with values indicating that:
        the availability status was successfully returned;
        a parameter in the request was invalid; or
        an error occurred.

5. A method as recited in claim 1, wherein the receiving step comprises receiving a get-mode-access request inquiring about an access type of the component for a read-write mode, wherein the get-mode-access request comprises a parameter that specifies a read-write mode.

6. A method as recited in claim 1, wherein
    the receiving comprises receiving a get-mode-access request inquiring about an access type of the component for a read-write mode, wherein the get-mode-access request comprises a parameter that specifies a read-write mode;
    the get-mode-access request comprises a memory address for holding a value indicating whether the component:
        is sharable access type for the specified read-write mode;
        has exclusive access type for the specified read-write mode; or
        is not accessible in the specified read-write mode.

7. A method as recited in claim 1, wherein the receiving comprises receiving a get-mode-access request inquiring about an access type of the component for a read-write mode and the get-mode-access request comprises a parameter that specifies a read-write mode, further comprising:
    responding to the get-mode-access request with values indicating that:
        the access type was successfully determined;
        a parameter in the request was invalid; or
        an error occurred.

8. A method as recited in claim 1, wherein the receiving comprises receiving a put-mode-access request for setting of an access type of the component for a read-write mode, wherein the put-mode-access request comprises a parameter that specifies a read-write mode.

9. A method as recited in claim 1, wherein
    the receiving comprises receiving a put-mode-access request for setting of an access type of the component for a read-write mode,
    the put-mode-access request comprises parameters that:
        specify a read-write mode; and
        specify an access type for the specified read-write mode, wherein
    such access type is either "sharable" or "exclusively sharable."

10. A method as recited in claim 1, wherein the receiving comprises receiving a put-mode-access request for setting of an access type of the component for a read-write mode, the put-mode-access request comprises a parameter that specifies a read-write mode, and the put-mode-access request comprises a parameter that specifies a read-write mode, the method further comprising:
    responding to the put-mode-access request with values indicating that:
        the access type was successfully set;
        a parameter in the request was invalid; or
        access was denied.

11. A method as recited in claim 1, wherein the receiving comprises receiving a get-minidriver request specifying an interface to a mini-driver for the component to be used for communications with the component.

12. A method as recited in claim 1, wherein the receiving comprises receiving a get-minidriver request specifying an interface to a mini-driver for the component to be used for communications with the component, wherein the get-minidriver request comprises a parameter with a memory address to mini-driver's interface.

13. A method as recited in claim 1, wherein the receiving comprises receiving a get-minidriver request specifying an interface to a mini-driver for the component to be used for communications with the component and the get-minidriver request comprises a parameter with a memory address to mini-driver's interface, further comprising:
    responding to the get-minidriver request with values indicating that:
        the mini-driver's interface is accessible; or
        a parameter in the request was invalid.

14. A method as recited in claim 1, wherein the receiving comprises receiving a get-data request seeks data from the component.

15. A method as recited in claim 1, wherein
    the receiving comprises receiving a get-data request seeks data from the component, wherein the get-data request comprises parameters comprising:
        a memory address of data sent to and returned from the component;
        a memory address of an interface to convert data returned from the component; and
        a value indicating time to wait for a reply to the get-data request.

16. A method as recited in claim 1, the receiving comprises receiving a get-data request seeks data from the component, further comprising:

responding to the get-data request with values indicating that:
   the data was successfully retrieved from the component;
   the component cannot return data that the get-data request seeks;
   a parameter in the request was invalid;
   access to the component is denied; or
   an error occurred.

17. A method as recited in claim 1, wherein the receiving comprises receiving a set-data request seeks to instruct the component to perform an action.

18. A method as recited in claim 1, wherein
   the receiving comprises receiving a set-data request seeks to instruct the component to perform an action by sending control data to the component, wherein the set-data request comprises parameters comprising:
      a memory address of the control data being sent the component;
      a memory address of an interface to convert the control data sent to the component; and
      a value indicating time to wait for a reply to the set-data request.

19. A method as recited in claim 1, the receiving comprises receiving a set-data request seeks to instruct the component to perform an action by sending control data to the component, further comprising:
   responding to the set-data request with values indicating that:
      control data was sent to the component;
      the component cannot perform the action indicated by the control data;
      a parameter in the request was invalid;
      access to the component is denied; or
      an error occurred.

20. A method as recited in claim 1, wherein the receiving comprises receiving a put-notify-sink request for instructing the component to send asynchronous notifications to the computer.

21. A method as recited in claim 1, wherein
   the receiving comprises receiving a put-notify-sink request for instructing the component to send asynchronous notifications to the computer:
   the put-notify-sink request comprises parameters comprising:
      a memory address of an event-sink interface;
      a memory address of data that contains additional information for starting the notification;
      a memory address of an interface to convert the control data returned from the component; and
      a value indicating frequency at which notification should be sent.

22. A method as recited in claim 1, wherein the receiving comprises receiving a put-notify-sink request for instructing the component to send asynchronous notifications to the computer, the method further comprising:
   responding to the put-notify-sink request with values indicating that:
      a notification sink was successfully set;
      a parameter in the request was invalid;
      access to the component is denied; or
      an error occurred.

23. A method as recited in claim 1, wherein
   the component has a read-write mode and an access type for each read-write mode;
   the request specifies a read-write mode and sets a present access type of the component for the specified read-write mode.

24. A method as recited in claim 1, wherein
   the component has an associated mini-driver that facilitates communication between an application and the component;
   the request specifies that communications to the component will be facilitated by the component's associated mini-driver.

25. A method as recited in claim 1, wherein the request seeks data regarding the component.

26. A method as recited in claim 1, wherein the component can control functions of the vehicle and the request instructs the component to control one or more of such functions.

27. A computer-readable medium having computer-executable instructions that, when executed by a computer, performs the method as recited in claim 1.

28. A method as recited in claim 1 further comprising responding to the request.

29. A method as recited in claim 28, wherein
   the component has properties that define a read-write mode and each mode has additional properties that define an access type;
   the request specifies a read-write mode and inquires about a present access type of the component for the specified read-write mode;
   the response indicates the component's present access type for the request's specified read-write mode.

30. An automobile vehicle computer comprising:
   a processor configured to execute an operating system and one or more applications;
   an application program interface (API) set comprising a component communications method ("device-com" method), the device-com method being executable on the processor to facilitate communication between applications and objects that are representative of vehicle components;
   the API set further comprising a component communication helper method ("device-com" method), the device-com helper executable on the processor to:
      receive a request to communicate with a component through a representative object of the component;
      facilitate communication processing low-level communications between the component and its object.

31. A vehicle computer as recited in claim 30, wherein
   the component has a read-write mode and an access type for each read-write mode;
   the request specifies a read-write mode and inquires about a present access type of the component for the specified read-write mode;
   the response indicates the component's present access type for the request's specified read-write mode.

32. A vehicle computer as recited in claim 30, wherein
   the component has a read-write mode and an access type for each read-write mode;
   the request specifies a read-write mode and sets a present access type of the component for the specified read-write mode.

33. A vehicle computer as recited in claim 30, wherein
   the component has an associated mini-driver that facilitates communication between the device-helper method and the component;
   the request specifies that communications to the component will be facilitated by the component's associated mini-driver.

34. A vehicle computer as recited in claim 30, wherein the request seeks data regarding the component.

35. A vehicle computer as recited in claim 30, wherein the component can control functions of the vehicle and the request instructs the component to control one or more of such functions.

36. A computer-readable medium having computer-executable instructions that, when executed by a computer, performs the method as recited in claim 30.

37. In an automobile vehicle computer system having a vehicle computer operatively coupled with vehicle components, the vehicle computer having an application program interface (API) set for communicating to components, a component communications method comprising:

receiving a request from an application to communicate with a component via an object logically representing the component;

facilitating such request by invoking a component communications helper method ("device-helper" method) to communicate with the component;

communicating with the component.

38. A method as recited in claim 37, further comprising:
receiving a response from the component, wherein the response contains data in a raw format;
converting the data in the response into a format expected by an application.

39. A computer-readable medium having computer-executable instructions for application program interfaces (APIs) that, when executed by a vehicle computer in a vehicle computer system, the vehicle computer having a component communications helper configured to facilitate communication with components, performs the method comprising:

receiving a request from an application to communicate with a component via an object logically representing the component;

facilitating such request by invoking a component communications helper method ("device-helper" method) to communicate with the component;

communicating with the component.

40. A computer-readable medium performs the method as recited in claim 39, wherein the receiving comprises receiving a get-availability request to get an availability status of the component;

the get-availability request comprises a memory address for holding a true-or-false value that indicates whether the component is available.

41. A computer-readable medium performs the method as recited in claim 39, wherein the receiving comprises receiving a get-availability request to get an availability status of the component, further comprising responding to the get-availability request with values indicating that:
the availability status was successfully returned;
a parameter in the request was invalid; or
an error occurred.

42. A computer-readable medium performs the method as recited in claim 39, wherein the receiving comprises receiving a get-mode-access request inquiring about an access type of the component for a read-write mode, wherein the get-mode-access request comprises a parameter that specifies a read-write mode;

the get-mode-access request comprises a memory address for holding a value indicating whether the component:

is sharable access type for the specified read-write mode;
has exclusive access type for the specified read-write mode; or
is not accessible in the specified read-write mode.

43. A computer-readable medium performs the method as recited in claim 39, wherein the receiving comprises receiving a get-availability request inquiring about an access type of the component for a read-write mode and the get-mode-access request comprises a parameter that specifies a read-write mode, further comprising:

responding to the get-mode-access request with values indicating that:
the access type was successfully determined;
a parameter in the request was invalid; or
an error occurred.

44. A computer-readable medium performs the method as recited in claim 39, wherein the receiving comprises receiving a put-mode-access request for setting of an access type of the component for a read-write mode, the put-mode-access request comprises parameters that:
specify a read-write mode; and
specify an access type for the specified read-write mode, wherein such access type is either "sharable" or "exclusively sharable."

45. A computer-readable medium performs the method as recited in claim 39, wherein the receiving comprises receiving a put-mode-access request for setting of an access type of the component for a read-write mode, the put-mode-access request comprises a parameter that specifies a read-write mode, and the put-mode-access request comprises a parameter that specifies a read-write mode, the method further comprising:

responding to the put-mode-access request with values indicating that:
the access type was successfully set;
a parameter in the request was invalid; or
access was denied.

46. A computer-readable medium performs the method as recited in claim 39, wherein the receiving comprises receiving a get-data request seeks data from the component, wherein the get-data request comprises parameters comprising:
a memory address of data returned from the component;
a memory address of an interface to convert data returned from the component; and
a value indicating time to wait for a reply to the get-data request.

47. A computer-readable medium performs the method as recited in claim 39, the receiving comprises receiving a get-data request seeks data from the component, further comprising:

responding to the get-data request with values indicating that:
the data was successfully retrieved from the component;
the component cannot return data that the get-data request seeks;
a parameter in the request was invalid;
access to the component is denied; or
an error occurred.

48. A computer-readable medium performs the method as recited in claim 39, wherein the receiving comprises receiving a set-data request seeks to instruct the component to perform an action by sending control data to the component, wherein the set-data request comprises parameters comprising:
- a memory address of the control data being sent the component;
- a memory address of an interface to convert the control data sent to and returned from the component; and
- a value indicating time to wait for a reply to the set-data request.

49. In an automobile vehicle computer system having a vehicle computer operatively coupled with vehicle components, the components having representative objects, the vehicle computer having an application program interface (API) set comprising a component communications method ("device-com" method) and component communications helper method ("device-helper" method), a component communications method comprising:
- invoking a get-data device-com method to request data from a component via an object that is representative of the component;
- invoking a corresponding get-data device-helper method to facilities communication with the component.

* * * * *

UNITED STATES PATENT AND TRADEMARK OFFICE
CERTIFICATE OF CORRECTION

PATENT NO. : 6,449,541 B1
DATED : September 10, 2002
INVENTOR(S) : Goldberg et al.

It is certified that error appears in the above-identified patent and that said Letters Patent is hereby corrected as shown below:

Column 1,
Line 45, replace "monitor 23," with -- monitor 24, --.
Line 45, replace "security sensors 25," with -- security sensors 26, --.
Line 45, replace "player 27," with -- player 28, --.
Lines 45 and 46, replace "antenna(s) 29," with -- antenna 30 --.
Line 46, replace "speakers 31" with -- speaker 32 --.
Line 46, replace "a GPS receiver 33" with -- a GPS receiver 34 --.
Line 47, replace "component 35," with -- component 36, --.
Line 47, replace "component(s) 37," with -- component(s) 38 --.
Line 48, delete "11" between "vehicle" and "component(s)".
Line 48, replace "component(s) 39." with -- component(s) 40. --.

Column 7,
Line 45, replace "applications' " with -- applications --.

Column 10,
Line 20, replace "verif" with -- verify --.
Line 61, replace "dw,ccessMode" with -- dwAccessMode --.

Column 11,
Line 44, replace "*pconvert," with -- *pConvert, --.

Column 12,
Line 7, replace "*pconvert," with -- *pConvert, --.
Line 30, replace "put_Notif Sink" with -- put_NotifySink --.
Line 38, replace "*pconvert," with -- *pConvert, --.

UNITED STATES PATENT AND TRADEMARK OFFICE
CERTIFICATE OF CORRECTION

PATENT NO. : 6,449,541 B1
DATED : September 10, 2002
INVENTOR(S) : Goldberg et al.

It is certified that error appears in the above-identified patent and that said Letters Patent is hereby corrected as shown below:

Column 18,
Line 33, replace "("device-com" " with -- (device-helper" --.

Signed and Sealed this

Eleventh Day of February, 2003

JAMES E. ROGAN
*Director of the United States Patent and Trademark Office*